United States Patent [19]

Borman et al.

[11] Patent Number: 5,486,562

[45] Date of Patent: Jan. 23, 1996

[54] MODIFICATIONS OF POLY(ALKYLENE CYCLOHEXANEDICARBOXYLATE) BLENDS

[75] Inventors: Willem F. H. Borman, Evansville; Nan-I Liu, Mt. Vernon, both of Ind.

[73] Assignee: General Electric Company, Pittsfield, Mass.

[21] Appl. No.: 284,725

[22] Filed: Aug. 2, 1994

Related U.S. Application Data

[63] Continuation of Ser. No. 957,459, Oct. 6, 1992, abandoned, which is a continuation of Ser. No. 551,397, Jul. 12, 1990, abandoned.

[51] Int. Cl.$^6$ ..................................................... C08L 69/02
[52] U.S. Cl. ...................... 524/451; 524/504; 524/513; 525/64; 525/174; 525/175
[58] Field of Search ........................... 525/64, 175, 174; 524/451, 504, 513

[56] References Cited

U.S. PATENT DOCUMENTS

| | | |
|---|---|---|
| 2,465,319 | 3/1949 | Whinfield et al. . |
| 2,675,390 | 4/1954 | Rosenblatt . |
| 2,888,484 | 5/1959 | Dehm et al. . |
| 2,891,930 | 6/1959 | Caldwell et al. . |
| 2,901,466 | 8/1959 | Kibler et al. . |
| 2,933,480 | 4/1960 | Gresham et al. . |
| 3,000,866 | 9/1961 | Tarney . |
| 3,000,867 | 9/1961 | Fisher . |
| 3,047,539 | 7/1962 | Pengilly . |
| 3,444,237 | 5/1969 | Jaffe . |
| 3,515,628 | 6/1970 | Jackson, Jr. et al. . |
| 3,644,267 | 2/1972 | Jackson, Jr. et al. . |
| 3,657,389 | 4/1972 | Caldwell et al. . |
| 3,758,640 | 9/1973 | Thrope ...................................... 525/64 |
| 3,944,631 | 3/1976 | Yu et al. . |
| 4,011,286 | 3/1977 | Seymour ................................... 525/92 |
| 4,034,013 | 7/1977 | Lane . |
| 4,066,600 | 1/1978 | Pletcher et al. . |
| 4,096,202 | 6/1978 | Farnham et al. . |
| 4,180,494 | 12/1979 | Fromuth et al. . |
| 4,327,206 | 4/1982 | Jackson, Jr. et al. . |
| 4,349,469 | 9/1982 | Davis ....................................... 524/765 |
| 4,709,982 | 12/1987 | Corne et al. . |
| 4,754,064 | 6/1988 | Lillwitz . |
| 4,764,563 | 8/1988 | Meredith et al. . |
| 4,939,206 | 7/1990 | Wang . |
| 4,968,731 | 11/1990 | Lausberg ................................... 525/64 |
| 4,968,746 | 11/1990 | DeRudder et al. . |

FOREIGN PATENT DOCUMENTS

| | | |
|---|---|---|
| 0166900 | 1/1986 | European Pat. Off. . |
| 0248352 | 12/1987 | European Pat. Off. . |
| 0310978 | 4/1989 | European Pat. Off. . |
| 0320647 | 6/1989 | European Pat. Off. . |
| 369201 | 5/1990 | European Pat. Off. . |
| 369204 | 5/1990 | European Pat. Off. . |
| 369203 | 5/1990 | European Pat. Off. . |
| 369202 | 5/1990 | European Pat. Off. . |
| 0402278 | 12/1990 | European Pat. Off. . |

OTHER PUBLICATIONS

W. J. Jackson, Jr. et al., "Polyester Hot–Melt Adhesives. I. Factors Affecting Adhesion to Epoxy Resin Coatings", Journal of Applied Polymer Science, vol. 14, pp. 685–698 (1970).

Freifelder et al., Journal of Organic Chemistry, 31, 34–38 (1966).

Wilfong et al., J. Polymer Sci., vol. 54, 385–410 (1961).

Carpenter et al., Journal of Soc. Dyers and Colorists, vol. 65, 469 (1941).

*Primary Examiner*—Patricia A. Short

[57] ABSTRACT

Compositions are provided which comprise (A) a polyester resin which comprises the reaction product of at least one straight chain, branched, or cycloaliphatic $C_2$–$C_{10}$ alkane diol or chemical equivalent thereof, and a cycloaliphatic diacid or chemical equivalent thereof; and (B) an effective impact strength or tensile property modifying amount of a substantially amorphous copolymer resin. These compositions are homogeneous and exhibit excellent light stability, chemical resistance, particularly to gasoline and similar automotive chemicals, excellent impact strength even at low temperatures and excellent tensile properties.

20 Claims, No Drawings

MODIFICATIONS OF POLY(ALKYLENE CYCLOHEXANEDICARBOXYLATE) BLENDS

This is a continuation of Ser. No. 07/957,459 filed on Oct. 6, 1992, now abandoned; which is a continuation of Ser. No. 07/551,397 filed Jul. 12, 1990 also abandoned.

CROSS-REFERENCE TO RELATED APPLICATIONS

This application is related to the following commonly owned, concurrently filed U.S. patent applications.

| SERIAL NO. | SUBJECT MATTER | APPLICANT(S) |
| --- | --- | --- |
| 07/551,392 now abandoned | Poly(alkylene cyclohexane-dicarboxylate)-polycarbonate Compositions and Modifications | W. F. H. Borman N-I Liu |
| 07/551,396 now U.S. Pat. No. 5,399,661 | Poly(alkylene cyclohexane-dicarboxylate)-(alkylene terephthalate) Copolyesters | W. F. H. Borman |
| 07/551,395 now U.S. Pat. No. 5,326,111 | Poly(alkylene cyclohexane-dicarboxylate) Binary Blends | W. F. H. Borman N-I Liu |

1. Field of the Invention

This invention relates to compositions comprised of (A) a polyester resin comprising the reaction product of at least one straight chain, branched, or cycloaliphatic $C_2$–$C_{10}$ alkane diol or chemical equivalent thereof, and at least one cycloaliphatic diacid or chemical equivalent thereof; and (B) an effective impact strength or tensile property modifying amount of a substantially amorphous copolymer resin. Filled and flame retardant compositions are contemplated as well. These compositions are homogeneous and have excellent light stability; good chemical resistance, in particular to gasoline and similar automotive chemicals; excellent impact strength even at low temperatures; excellent tensile properties; and enhanced melt flow properties while retaining excellent impact strength.

2. Background of the Invention

Novel compositions comprising a polymer resin which is the reaction product of at least one straight chain, branched, or cycloaliphatic $C_2$–$C_{10}$ alkane diol or a chemical equivalent thereof and at least one cycloaliphatic diacid or a chemical equivalent thereof combined with an effective impact strength or tensile property modifying amount of a substantially amorphous copolymer resin have been discovered which are homogeneous and have excellent light stability, good chemical resistance, excellent impact strength even at low temperature, and excellent tensile properties.

Weatherable, chemical resistant, UV radiation resistant, resilient, high impact polymer compositions have great application in the manufacture of molded or thermoformed products such as automobile external parts, lawn and garden equipment, and sporting goods.

Crystallizable polyesters of cycloaliphatic diacids or derivatives thereof with aliphatic and/or cycloaliphatic diols have relatively high melting points and are quite UV resistant as they do not appreciably absorb near-UV light. Many of these polyesters were explored for use as hot melt adhesives. See, Jackson et al, J. Applied Polymer Science, Vol. 14, 685–98, (1970); U.S. Pat. No. 3,515,628.

Wilfong, J. Polymer Sci., Vol. 54,385–410 (1961), referred to polyesters of hexahydro terephthalic acid, the cis-/trans-mixtures of cyclohexane dicarboxylic acids obtained by the hydrogenation of terephthalic acid. See, Caldwell et al, U.S. Pat. No. 2,891,930 including poly(neopentyl cyclohexane dicarboxylate); Carpenter, Journal of Soc. Dyers and Colorists, Vol. 65, 469 (1941).

Kibler et al, U.S. Pat. No. 2,901,466, disclose linear polyesters and polyester-amides prepared by condensing cis-and/or trans-1,4-cyclohexanedimethanol with one or more bifunctional reactants which, because of high melting temperatures, are advantageous for the preparation of fibers for use in fabrics and films for use as support for photographic emulsions.

Low viscosity thermoplastic adhesives comprising a thermoplastic resin, a linear polyester, a polymer of a mono-olefinically unsaturated monomer, a viscosity decreasing additive and an optional granular metallic material are disclosed by Jackson et al, U.S. Pat. No. 3,644,627.

Caldwell et al, U.S. Pat. No. 3,657,389 blended polyesters of 1,4-butane diol and terephthalic or trans-1,4-cyclohexane dicarboxylic acid with polystyrene to improve hot melt-adhesives.

Friction activatable solvent-free adhesives comprising a thermoplastic polyester derived from one or more saturated aliphatic dicarboxylic acid and/or aromatic dicarboxylic acids and one or more saturated aliphatic diols, a tackifier, and a plasticizer are disclosed by Wayne et al, U.S. Pat. No. 4,066,600.

Jackson et al, U.S. Pat. No. 4,327,206 disclose a process for the preparation of poly(1,4-cyclohexanedicarboxylate) polyesters with high trans-isomer content comprising heating, in the presence of a suitable catalyst, an ester of trans-1,4-cyclohexanedicarboxylic acid and a diacyl derivative of an aromatic diol.

Copending applications, U.S. Ser. Nos. 07/271,250, now U.S. Pat. No. 5,045,595 07/271,248, now U.S. Pat. No. 5,106,908, 07/271,247, now U.S. Pat. No. 5,087,662, 07/271,230, now U.S. Pat. No. 4,939,206, and 07/271,896, now U.S. Pat. No. 4,968,946, all filed on Nov. 14, 1988, describe polyorganosiloxane/polyvinyl-based graft polymer modifiers combined with various polyester resins but do not specify the poly(alkylene cyclohexane dicarboxylate) resins of the present invention.

Copending applications, U.S. Ser. Nos. 07/271,246, now U.S. Pat. No. 5,025,066, filed on Nov. 14, 1988 and 07/356,356, now U.S. Pat. No. 5,079,293, filed on May 24, 1989, describe combinations of any of organosiloxane-based, diene rubber-based and polyorganosiloxane/polyvinyl-based modifiers with polyester resins but do not describe the polyester resins of the present invention.

Major shortcomings of many of the previous compositions are their inability to withstand UV radiation and chemicals such as gasoline, while exhibiting acceptable impact strength and tensile properties.

Many of these shortcomings are overcome by compositions of the present invention. The compositions of the present invention are homogeneous, exhibit good impact strength and tensile properties, are chemically resistant in part due to the fact that the crystalline nature of the polyester is retained in the compositions, and are UV light resistant.

SUMMARY OF THE INVENTION

According to the present invention, there are provided compositions comprising (A) a polyester resin comprising the reaction product of (a) at least one straight chain, branched, or cycloaliphatic $C_2-C_{10}$ alkane diol or chemical equivalent thereof; and (b) at least one cycloaliphatic diacid or chemical equivalent thereof; and (B) an effective impact strength or tensile property modifying amount of a substantially amorphous copolymer resin.

In a preferred embodiment, polyester (A) is the reaction product of (a) at least one straight chain or branched $C_2-C_{10}$ alkane diol and (b) as above.

Further contemplated by the invention are compositions as described above wherein the modifier (B) is selected from the group consisting of (a) an interpolymer comprising (i) a cross-linked acrylate elastomer, (ii) a cross-linked alkenyl aromatic-vinyl cyanide copolymer, and optionally (iii) an additional vinyl-based polymer or copolymer which may the same as or different than (i) or (ii); (b) a multi-stage core-shell polymer having a rubbery core derived from an acrylate or a (meth)acrylate, a diene or a mixture of any of the foregoing, and a vinyl-based polymer or copolymer shell; (c) a multi-stage organosiloxane graft polymer composition comprising (i) as a first stage (1) an organosiloxane polymer substrate or (2) a polymeric co-homopolymerized substrate comprised of, in combination, an organosiloxane polymer, at least one vinyl-based polymer, and optional units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (ii) at least one subsequent stage or stages graft polymerized in the presence of any previous stages which is comprised of a vinyl-based polymer or a cross-linked vinyl-based polymer; (d) an ethylene-propylene-diene terpolymer or grafted derivative thereof; (e) a styrene-ethylene-butene-styrene polymer; (f) a vinyl cyanide-conjugated diolefin-alkenyl aromatic terpolymer; or (g) a combination of any of the foregoing.

DETAILED DESCRIPTION OF THE INVENTION

The diols useful in the preparation of the polyesters resins (A) of the present invention are straight chain, branched, or cycloaliphatic but preferably straight chain or branched alkane diols and may contain from 2 to 10 carbon atoms. Examples of such glycols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3and 1,5-pentane diol; dipropylene glycol; 2-methyl-1,5-pentane diol; 1,6-hexane diol; 1,4-cyclohexane dimethanol and particularly its cis- and trans-enantiomers; triethylene glycol; 1,10-decane diol; and mixtures of any of the foregoing. Particularly preferred is 1,4-butane diol. If a cycloaliphatic diol or chemical equivalent thereof and particularly 1,4-cyclohexane dimethanol or its chemical equivalents are to be used as the diol component, it is preferred that a mixture of cis- to trans-enantiomer thereof, ranging from 1 to 4 to 4 to 1, and preferably, a ratio of 1 to 3 is used.

Chemical equivalents to the diols include esters and ethers, such as dialkylesters, diaryl esters, polytetramethylene oxide and the like.

The diacids (A)(b) useful in the preparation of the polyester resins (A) of the present invention are cycloaliphatic diacids. This is meant to include carboxylic acids having two carboxyl groups each of which is attached to a saturated carbon in a saturated ring. A preferred diacid is 1,4-cyclohexanedicarboxylic acid and most preferred is trans-1,4-cyclohexanedicarboxylic acid as further explained above.

Cyclonexanedicarboxylic acids and their chemical equivalents can be prepared, for example, by the hydrogenation of cycloaromatic diacids and corresponding derivatives such as isophthalic acid or terephthalic acid in a suitable solvent, water or acetic acid at room temperature and at atmospheric pressure using suitable catalysts such as rhodium supported on a suitable carrier of carbon or alumina. See, Friefelder et al, *Journal of Organic Chemistry*, 31, 34–38 (1966); U.S. Pat. Nos. 2,675,390 and 4,754,064. They may also be prepared by the use of an inert liquid medium in which a phthalic acid is at least partially soluble under reaction conditions and a catalyst of palladium or ruthenium in carbon or silica. See, U.S. Pat. Nos. 2,888,484 and 3,444,237.

Typically, in the hydrogenation, two enantiomers are obtained in which the carboxylic acid groups are in cis- or trans-positions. The cis- and trans-enantiomers can be separated by crystallization with or without a solvent, for example, n-heptane, or by distillation. The cis-enantiomer tends to blend better; however, the trans-enantiomer has higher melting and crystallization temperatures and is especially preferred. Mixtures of the cis- and trans-enantiomers are useful herein as well, and preferably when such a mixture is used, the trans-enantiomer will comprise at least about 75 parts by weight and the cis-enantiomer will comprise the remainder based upon 100 parts by weight of cis- and trans-enantiomers combined.

When the mixture of enantiomers or more than one diacid is used, a copolyester or a mixture of two polyesters for use as component (A) may be used.

Chemical equivalents of these diacids include esters, alkyl esters, e.g., dialkyl esters, diaryl esters, anhydrides, acid chlorides, acid bromides, and the like. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two enantiomers having the carboxylic acid groups in the cis and trans-positions are obtained. The enantiomers can be separated as above, and the trans-enantiomer is especially preferred for the reasons above. Mixtures of the enantiomers are suitable as explained above and preferably in the amount as explained above.

The polyester resins (A) of the present invention are typically obtained through the condensation or ester interchange polymerization of the diol or diol equivalent component (A)(a) with the diacid or diacid chemical equivalent component (A)(b) and have recurring units of the formula

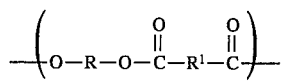

wherein R represents an alkyl or cycloalkyl radical containing 2 to 10 carbon atoms and which is the residue of a straight chain, branched, or cycloaliphatic alkane diol having 2 to 10 carbon atoms or chemical equivalents thereof; and $R^1$ is a cycloaliphatic radical which is the decarboxylated residue derived from a cycloaliphatic diacid or chemical equivalent thereof. They particularly have recurring units of the formula

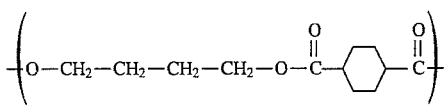

wherein R from above is derived from 1,4-butane diol; and wherein $R^1$ from above is a cyclohexane ring derived from cyclohexanedicarboxylate or a chemical equivalent thereof and is selected from the cis- or trans-isomers or a mixture of cis- and trans-isomers thereof.

All such polyesters can be made following the teachings of, for example, U.S. Pat. Nos. 2,465,319 and The reaction is generally run with an excess of the diol component and in the presence of a suitable catalyst such as a tetrakis(2-ethyl hexyl)titanate, in a suitable amount, typically about 20 to 200 ppm of titanium based upon the final product.

The substantially amorphous copolymer resin (B) may comprise one of several different modifiers or combinations of two or more of these modifiers. Suitable are the groups of modifiers known as ASA modifiers, acrylate or diene rubber-based modifiers, organosiloxane modifiers, EPDM modifiers, SBPS modifiers, and ABS modifiers.

The term ASA modifier is used to refer to multi-stage interpolymer modifiers having a cross-linked (meth)acrylate rubbery phase, preferably butyl acrylate. Associated with this cross-linked rubbery phase is a phase comprised of cross-linked styrenic resin, preferably styrene, which interpenetrates the cross-linked rubbery phase. Incorporation of small amounts of other monomers such as acrylonitrile or (meth)acrylonitrile within the resin also provides products within this class of modifiers. The interpenetrating network is provided when the monomers forming the resin phase are polymerized and cross-linked in the presence of the previously polymerized and cross-linked (meth)acrylate rubbery phase.

The interpolymer compositions may be formed by the following two-step, sequential polymerization process:

1. emulsion polymerizing an acrylate monomer charge of at least one $C_2$–$C_{10}$ alkyl or alkoxyalkyl acrylate, $C_8$–$C_{12}$ alkyl or alkoxyalkyl methacrylate, or compatible mixtures thereof (all of which may be referred to as (meth)acrylate), in an aqueous polymerization medium in the presence of an effective amount of a suitable di- or polyethylenically unsaturated cross-linking agent for such type of monomer, with the $C_4$–$C_8$ alkyl or alkoxyalkyl acrylates being the preferred acrylate monomers for use in this step;

2. emulsion polymerizing a monomer charge of styrene or styrene/(meth)acrylonitrile in an aqueous polymerization medium, also in the presence of an effective amount of a suitable di- or polyethylenically unsaturated cross-linking agent for such monomers, said polymerization being carried out in the presence of the product from Step 1 so that the cross-linked (meth)acrylate and cross-linked vinyl aromatic, e.,g., styrene or styrene/(meth)acrylonitrile, components form an interpolymer wherein the respective phases interpenetrate one another.

The final multi-stage rubbery product that is formed thereby can be isolated and dried.

One manner of proceeding in conducting the aqueous emulsion polymerization step leading to the preparation of the cross-linked (meth)acrylate rubbery phase comprises preferably first preparing a monomer charge comprising an aqueous mixture containing about 10 to 50 percent by weight, of one or more monomers, the identity of which will be described in detail hereinbelow and from about 0.2 to 2.0 percent weight of the monomer mixture, of a water-soluble catalyst, such as ammonium, sodium or potassium persulfate, hydrogen peroxide or a redox system, such as a mixture of a persulfate with an alkali metal bisulfite, thiosulfate or hydrosulfite. The mixture is then heated at a temperature of from about 40° C. to 95° C. for a period of about 0.5 to about 8 hours.

The (meth)acrylate elastomer phase comprises cross-linked (meth)acrylate polymers or copolymers having a Tg, i.e., glass transition temperature, of less than about 25° C. These can be polymerized by means of free radical initiated emulsion techniques. These (meth)acrylate elastomer polymers should be cross-linked so that they can retain their integrity during subsequent polymer processing steps. This cross-linking can be achieved during the polymerization of the elastomer if a polyfunctional ethylenically unsaturated monomer is included in the polymerization recipe. The term "cross-linked" with respect to the ASA modifiers denotes a polymer which at ambient temperatures is substantially insoluble in organic solvents such as tetrahydrofuran or cyclohexanone.

Examples of (meth)acrylate elastomers that can be used include the cross-linked polymers of the $C_2$–$C_{10}$ alkyl acrylate and the $C_8$–$C_{12}$ alkyl methacrylate monomers, preferably the $C_2$–$C_8$ alkyl acrylates, such as poly(n-butyl acrylate), poly(ethyl acrylate) and poly(2-ethylhexylacrylate). At least one acrylate monomer is utilized in this step. If desired, the monomer charge may contain small amounts, i.e., 1 to 20 percent by weight of the amount of acrylate monomer, of optional monomers including styrene, acrylonitrile, methacrylonitrile, methyl methacrylate, methacrylic acid, acrylic acid, vinylidene chloride, vinyl toluene and any other ethylenically unsaturated monomer copolymerizable with the acrylate monomer selected for use. Special mention is made of alkoxyalkyl (meth)acrylates, specifically ethoxyethyl and methoxymethyl (meth)acrylates, and acrylonitrile which will improve oil resistance while maintaining a low Tg.

In order to cross-link the (meth)acrylate monomer, from about 0.05 to about 10, preferably 0.1 to 5 percent by weight based on the weight of acrylate monomer, of at least one cross-linking agent is used. This cross-linking agent is, for the purposes of this class of modifiers, a di- or polyfunctional ethylenically unsaturated monomer having at least one vinyl group of the formula:

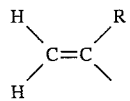

wherein R is hydrogen or lower alkyl. As is well known in the art, the vinyl groups on the cross-linking monomer can be the same, e.g., divinylbenzene, trimethylolpropane triacrylate, etc., or different, e.g., allyl methacrylate, diallyl fumarate, diallyl maleate, etc. Examples of other suitable cross-linking monomers which are known to persons in the art and which can be used are triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, diethylene glycol diacrylate, diethylene glycol dimethacrylate, 1,6-hexanediol diacrylate, 2,2-dimethylpropane 1,3-diacrylate, triallyl isocyanurate, divinylbenzene, pentaerythritol tetramethacrylate, dipentaerythritol monohydroxy-pentaacrylate, pentaerythritol triacrylate, ethoxylated trimethylolpropane triacrylate, polyethylene glycol diacrylate, tetraethylene glycol diacrylate, pentaerythritol tetraacrylate, 1,3-butylene glycol dimethacrylate, tripropylene glycol diacrylate, ethoxylated bisphenol-A dimethacrylate, ethoxylated bisphenol-A diacrylate, trimethylolpropane triacrylate, trimethylolpropane trimethacrylate, mixtures of any of the foregoing, and the like.

Optimum results are obtained by the use of a cross-linked copolymer containing from about 95 to about 99.9 percent by weight of n-butyl acrylate and from about 0.1 to about 5 percent by weight, of butylene glycol diacrylate.

The emulsifier which is used is at least one of the following conventional types: an anionic emulsifier, e.g., the $C_2$–$C_{22}$ carboxylic acids, the sulfates or sulfonates of $C_6$–$C_{22}$ alcohols or allyl phenols; a non-ionic emulsifier, e.g., the addition products of alkylene oxides to fatty acids, amines or amides; a combination of the foregoing anionic and non-ionic emulsifiers; or the cationic emulsifiers, e.g., quarternary ammonium containing compounds. The amount of emulsifier should be present from about 0.5 to about 5 percent by weight in the emulsion.

In the disclosure of Yu et al, U.S. Pat. No. 3,944,631, it has been found that regardless of the particular emulsifier being utilized in preparing the rubber polymer latex, is polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which in turn, may set up or coagulate the resulting polymer latex. However, by dividing the monomer charge and introducing it in about several portions, the resulting polymerization reaction remains controllable and overheating and coagulation can be prevented. An initiator is also present in the emulsion in an amount ranging from about 0.0005 to 2 percent by weight of the (meth)acrylate monomer. Suitable for use are water soluble peroxidic compounds, e.g., hydrogen peroxide and alkali metal and ammonium persulfates, oil soluble organic peroxides and azo compounds, e.g., benzoylperoxide, azobisisobutyronitrile and the like, used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used. A preferred initiator is ammonium persulfate.

A chain transfer agent such as an alkyl mercaptan, e.g., t-dodecyl mercaptan, toluene, xylene, chloroform, halogenated hydrocarbons and the like may also be used. A buffer to adjust the pH may be used.

The next step in the preparation of the interpolymer ASA modifiers is the emulsion polymerization of a mixture of vinyl aromatic monomers, e.g., styrene or styrene and acrylonitrile, in the presence of a minor portion of at least one difunctional or polyfunctional cross-linking monomer to form, for example, a cross-linked styrene homopolymer or styrene-acrylonitrile copolymer. This emulsion polymerization is carried out in the presence of the cross-linked (meth)acrylate rubbery phase by adding the styrene or styrene-acrylonitrile charge to the previously prepared aqueous emulsion of cross-linked (meth)acrylate rubbery phase. The amount of styrene or styrene-acrylonitrile which is added ranges from about 60 to about 10, preferably from about 50 to about 20 parts by weight based upon the weight of the final product which will be formed. When present, (meth)acrylonitrile preferably comprises from about 15 to about 45 parts by weight to, correspondingly, about 85 to about 55 parts by weight of vinyl aromatic monomer.

The monomer charge of styrene-acrylonitrile, when such a combination is used, can comprise from about 55:45 to about 85:15 weight parts of styrene to acrylonitrile with the most preferred ratio being about 76:24. If desired, small amounts, e.g., below about 20 parts by weight, of optional monomers can be included. Examples are t-butyl styrene, p-chlorostyrene, alpha-methylstyrene, methyl methacrylate, alkyl acrylate vinylidene chloride, ethylene, propylene, isobutylene and other ethylenic compounds copolymerizable with styrene and styrene-acrylonitrile.

The cross-linking agent, emulsifiers, initiators and chain transfer agents discussed in the previous step can also be used in this step in the same amounts to form the interpenetrating cross-linked styrene-acrylonitrile resin phase associated with the rubbery phase.

The term acrylate or diene-rubber based modifier is used to refer to core-shell multi-stage polymers having a core comprising an acrylate or methacrylate, a diene or a mixture of any of the foregoing.

In a preferred modifier of this type, the core is polymerized from a $C_1$ to $C_6$ alkyl acrylate resulting in an acrylic rubber core having a Tg below about 10° C. and containing cross-linking monomer and/or graft-linking monomer. The preferred acrylate is n-butyl acrylate.

The cross-linking monomer is a polyethylenically unsaturated monomer having a plurality of addition polymerizable reactive groups all of which polymerize at substantially the same rate of reaction. Suitable cross-linking monomers include polyacrylic and poly(methacrylic esters) of polyols such as butylene diacrylate and dimethacrylate, trimethylol propane trimethacrylate and the like, di- and tri-vinyl benzene, vinyl acrylate and methacrylate, and the like. The preferred cross-linking monomer is butylene diacrylate.

The graft-linking monomer is a polyethylenically unsaturated monomer having a plurality of addition polymerizable reactive groups, at least one of which polymerizes at a substantially different rate of polymerization from at least one other of said reactive groups. The function of the graft-linking monomer is to provide a residual level of unsaturation in the elastomeric phase, particularly in the later stages of polymerization, and consequently, at or near the surface of the elastomer particles. When the rigid thermoplastic shell stage is subsequently polymerized at the surface of the elastomer, the residual unsaturated, addition polymerizable reactive groups contributed by the graft-linking monomer participate in the subsequent reaction so that at least a portion of the rigid shell stage is chemically attached to the surface of the elastomer.

Among the effective graft-linking monomers are alkyl group-containing monomers of allyl esters of ethylenically unsaturated diacids, such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturations. The preferred graft-linking monomers are allyl methacrylate and diallyl maleate.

The final or shell stage monomer can be comprised of $C_1$–$C_{16}$ methacrylate, styrene, acrylonitrile, alkyl acrylates, alkyl methacrylate, dialkylaminoalkyl methacrylate, and the like. Preferably, the final stage monomer includes a major portion of a $C_1$–$C_4$ alkyl methacrylate.

One type of preferred core-shell multi-stage polymer has only two stages, the first stage or core being polymerized from a monomer system comprising butyl acrylate with butylene diacrylate as a cross-linking agent, allyl methacrylate or diallyl maleate as a graft-linking agent and a final stage or outer shell of polymerized methyl methacrylate. A preferred two stage core-shell multi-stage polymer of this type is commercially available under the tradename ACRYLOID® KM 330, also known as PARALOID® EXL 3330, from Rohm & Haas Company.

These core-shell multi-stage polymers are prepared sequentially by emulsion polymerization techniques wherein each successive outer stage or shell coats the previous stage polymer. By way of illustration, the monomeric $C_1$–$C_6$ acrylate, the cross-linking monomer and the graft-linking monomer are copolymerized in water in the presence of a free-radical generating catalyst and a polymerization regulator which serves as a chain transfer agent at a temperature on the order of from 15° C. to 80° C. The first elastomeric phase is formed in situ to provide a latex of the core copolymer.

Thereafter, the second rigid thermoplastic phase monomers are added and are emulsion polymerized with the core copolymer latex to form the core-shell multi-stage polymers. More detailed description of the preparation of the acrylate-based core-shell multi-stage polymers for use herein as component (B) are found in U.S. Pat. Nos. 4,034,013 and 4,096,202.

Another amorphous copolymer resin for use herein comprises a diene-based and preferably a butadiene-based core-shell multi-stage copolymer resin. These diene-based core-shell multi-stage copolymers generally comprise a conjugated diene-based core, an intermediate shell of polymerized vinyl monomer units and a final shell comprised of a polymerized monomeric component selected from the group consisting of an alkyl acrylate, preferably a $C_1$–$C_6$ alkyl acrylate; an alkyl methacrylate, preferably a $C_1$–$C_6$ alkyl methacrylate; acrylic acid; methacrylic acid; or a mixture of any of the foregoing with a cross-linking monomer.

More particularly, the core stage of the diene or butadiene-based core-shell copolymer component comprises polymerized conjugated diene units of a copolymer of polymerized diene units with polymerized units of a vinyl aromatic compound or mixtures of such compounds. Suitable conjugated dienes for use in the core stage include butadiene, isoprene, 1,3-pentadiene and the like. Illustrative vinyl aromatic compounds include styrene, alphamethylstyrene, vinyl toluene, paramethylstyrene, and the like and esters of acrylic or methacrylic acid. The core of these polymers should comprise a major portion of diene units. The preferred core-shell multi-stage polymer includes a core of a styrene-butadiene copolymer having a molecular weight within the range of about 150,000 to 500,000. The core stage may also include a cross-linking monomer.

Although it is optional but preferred, the butadiene-based core-shell polymer may include a second intermediate stage of a polymerized vinyl monomer grafted to the core stage. Suitable vinyl monomers for use in the second intermediate shell stage include, but are not limited to, styrene, vinyl toluene, alphamethylstyrene, halogenated styrene, naphthalene, or divinylbenzene. Styrene and vinyl cyanide compounds such as acrylonitriles, methacrylonitriles, and alpha-halogenated acrylonitriles are especially preferred. These vinyl monomers can be used either alone or in admixture.

The final or outer shell stage of the diene-based core-shell multi-stage polymer comprises polymerized units of a monomeric compound selected from the group consisting of alkyl acrylates, especially $C_1$–$C_6$ alkyl acrylate; alkyl methacrylate, especially $C_1$–$C_6$ alkyl methacrylates; acrylic acid; methacrylic acid; or a mixture of any of the foregoing together with a cross-linking monomer. More particularly, the monomeric compound may be a $C_1$–$C_6$ alkyl acrylate, e.g., methyl acrylate, ethyl acrylate, hexyl acrylate, and the like; a $C_1$–$C_6$ alkyl methacrylate, e.g., methyl methacrylate, ethyl methacrylate, hexyl methacrylate, and the like; acrylic acid or methacrylic acid. Methyl methacrylate is preferred.

In addition to the monomeric compound, the final or outer shell stage of the diene-based core-shell multi-stage polymer includes a cross-linking monomer. The cross-linking monomer, as described above, is a polyethylenically unsaturated monomer having a plurality of addition polymerizable reactive groups, all of which polymerize at substantially the same reaction rate. Suitable cross-linking monomers include poly acrylic and poly methacrylic acid esters of polyols such as butylene diacrylate and dimethacrylate, trimethylol propane trimethacrylate and the like, divinyl- and trivinylbenzene, vinyl acrylate and methacrylate and the like. The preferred cross-linking monomer is butylene diacrylate.

A particularly preferred core-shell multi-stage polymer for use herein is a core-shell polymer having a core polymerized from butadiene and styrene, methylmethacrylate and divinylbenzene, a second stage or shell polymerized from styrene, and a third stage or outer shell polymerized from methyl methacrylate and 1,3-butylene glycol dimethacrylate. Such a commercially available multi-stage core-shell polymer is ACRYLOID® KM 653, also known as PARALOID® EXL 3691, from Rohm and Haas Co.

The diene-based core-shell multi-stage polymers are also prepared sequentially by emulsion polymerization techniques wherein each successive stage or shell coats the previous stage polymer. The diene-based core-shell multi-stage polymers and the methods for their preparation are more fully described in U.S. Pat. No. 4,180,494.

The term organosiloxane modifier refers to multi-stage polyorganosiloxane-based graft polymers prepared with or without the incorporation of a vinyl-based polymer in the first stage substrate. Where incorporation of the vinyl-based polymer is desired, the process is generally described hereinbelow as a co-homopolymerization process.

Co-homopolymerization refers to a polymerization step where two distinct polymerization mechanisms are effected concurrently, including simultaneously. In particular, the first stage co-homopolymerization may encompass a siloxane polymerization (e.g., ring opening and condensation mechanism) in conjunction with a concurrent vinyl polymerization. The discrete mechanisms are not seen as competing with each other, but rather, two homopolymers are concurrently produced each retaining its own structure.

The co-homopolymerization process may provide two discrete networks rather than a random copolymer. It is possible that the network(s) comprises two or more distinct interpenetrating polymer phases, which provide the additional strength needed in the polyorganosiloxane. This is evidenced by the two distinct glass transition temperatures which can be detected by differential scanning calorimetry. Preferably, the product of the co-homopolymerization process is rubbery instead of a resin-like powder.

Subsequent to the co-homopolymerization of the siloxanes and vinyl-based monomers of the first step or the polymerization of the siloxane alone, at least one additional graft polymerization process is utilized to achieve these multi-stage polyorganosiloxane/polyvinyl-based graft polymers or the multi-stage polyorganosiloxane-based graft polymer.

The subsequent graft polymerization is preferably of at least one vinyl-based type monomer. A styrene/acrylonitrile copolymer, an alkyl(meth)acrylate polymer or alkyl-(meth)acrylate/acrylonitrile copolymer is particularly effective as the second stage graft polymer or copolymer, or as the outermost stage when intermediary stages are optionally utilized, and when two modifier compositions are utilized in combination.

Additional cross-linking and/or graft-linking agent can be utilized in this initial stage to provide the co-homopolymerized networks from both polymeric constituents which provide greater rubber integrity.

The first stage rubbery substrate is provided by a series of sequential processing steps. In a premixing step the ingredients required for the reaction of the organosiloxane(s) and optional vinyl-based monomer(s) are premixed with water and Suitable cross-linker(s), graft-linker(s), initiator(s) and surfactant(s). The premixed ingredients are homogenized by conventional means. The reactions may begin at this early stage of the process, but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactors, a 3 to 6 hour residence time at 75 to 90 degrees centigrade is adequate to complete the co-homopolymerization. Cooling for 2 to 6 hours will typically reduce the temperature to at least room temperature where the reaction mass can be held for 3 to 72 hours. Cooling to lower temperatures (e.g. 5 degrees centigrade) may sometimes be preferred to enhance the properties of the polyorganosiloxane/polyvinyl-based substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the substrate.

The initiator for the siloxane component can be any ionic ring opening type initiator when cyclic siloxanes are utilized, such as alkylarylsulfonic acids, alkyldiaryl-disulfonic acids, alkylsulfonic acids, and the like. The best suited example is dodecylbenzenesulfonic acid which can act as an initiator and at the same time as an emulsifier. In some cases, the joint use of a metal salt of an aforementioned sulfonic acid is also preferred.

The initiator for the optional styrenic or other vinyl-based monomers in the co-homopolymerization process can be any organic soluble radical initiator, such as azobisisobutyronitrile (AIBN) and the organic peroxides, e.g. benzoyl peroxide, dichlorobenzoyl peroxide, and tert-butyl perbenzoate. Also suitable are water-soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale, a single pass may be most practical.

The foregoing reaction steps must be followed by a suitable neutralization process to provide the polyorganosiloxane-based or polyorganosiloxane/polyvinyl-based modifiers. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl-based substrate which may serve as first stage of the graft polymer of the organosiloxane modifiers. Optionally, a first stage comprising an organosiloxane polymer with or without units derived from a cross-linking agent or agents and optionally units which serve as a graft-linking agent or agents may be employed. The organosiloxane polymer can be prepared in a manner according to the prior art, e.g. European Patent Application No. 0,166,900. Also suitable are mixtures of the co-homopolymerized substrate with silicone substrates.

The next stage involves the graft polymerization of additional vinyl-functional moieties onto graft sites provided by the rubbery substrate particles on the latex formed in the first stage.

The grafted polymers may be the product of a vinyl polymerization process. Suitable vinyl monomers for graft polymerization include, without limitation, alkenyl aromatic compounds such as styrene, divinylbenzene, alphamethylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; other vinyl compounds such as acrylamides, N-(mono or di-substituted)alkyl acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide, and N-phenyl (or alkyl) maleimide; and mixtures of these monomers.

The vinyl-based polymers of subsequent stages (c)(ii) in the organosiloxane-based or the organosiloxane/vinyl-based polymers preferably comprise at least one selected from the group consisting of alkenyl aromatic compounds, (meth)acrylate compounds, vinyl cyanide compounds, maleimide compounds and acrylamide compounds. Especially preferred are polystyrene, poly(methyl methacrylate), styrene/acrylonitrile copolymer, styrene/methyl methacrylate copolymer and methyl methacrylate/acrylonitrile copolymer.

The vinyl polymerization is accomplished in an emulsion; therefore, water-soluble initiators are suitable, e.g. potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of the type used to produce the organosiloxane-based modifiers are described as multi-stage graft polymerization processes wherein the initial stage provides a polymerized organosiloxane substrate or a co-homopolymerized organosiloxane/ vinyl-based substrate. This substrate may have sufficient grafting sites for a second or subsequent stage to be grafted thereto. Grafted polystyrene, poly(meth)acrylate, styrene/ acrylonitrile copolymer, methyl methacrylate/acrylonitrile copolymer or styrene/divinylbenzene copolymer as the outermost stage is preferred, yet many other intermediary stages such as a butyl acrylate stage are useful. Furthermore, the grafting of additional stages of the same or different kinds is also possible.

The organosiloxanes useful in the first stage of these modifiers are any of those known to produce silicone elastomers and may include those which are hydroxy-, vinyl-, hydride- or mercapto- end capped linear organosiloxane oligomers.

The polyorganosiloxanes will be comprised primarily of a mixture of units of the formula $$R_n SiO_{(4-n)/2}$$

wherein R is hydrogen or a monovalent hydrocarbon radical of about 1 to 16 carbon atoms and n is 0, 1 or 2. "n" may be another integer in a smaller number of organosiloxane units of the polyorganosiloxane.

The organosiloxanes generally are in cyclic form and have three or more siloxane units, and preferably are those having three to six units, although others may be used. Such organosiloxanes include, without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl-based monomers useful in conjunction with the co-homopolymerization of organosiloxanes in the first stage are preferred to be alkenyl aromatic compounds such as styrene, divinylbenzene, alpha-methyl-styrene, vinyl toluene, vinyl naphthalene, vinyl anthracene, and halogenated styrene or its derivatives. Other suitable vinyl-based monomers include acrylic acids and acrylates such as methyl-, ethyl-, alkyl-, or butylacrylate; methacrylates such as methyl methacrylate, or 2-ethylhexyl methacrylate; vinyl cyanides such as acrylonitrile, and methacrylonitrile; olefins such as ethylene, propylene, butadiene, isoprene, and chloroprene; and other vinyl compounds such as vinyl imidazole, 5-vinyl-2-norbornene, vinyl pyridine, vinyl pyrrolidinone, vinyl acetate, vinyl alkyl ethers, vinyl chloride, vinyl furan, N-vinylcarbazole, allyl (meth)acrylate, triallyl isocyanurate, ethylene di(meth)acrylate, butylene di(meth)acrylate, diallyl maleate, and maleic anhydride; maleimide compounds such as maleimide, and N-phenyl (or alkyl) maleimides; acrylamides; N-(mono or disubstituted) acrylamides; and mixtures of any of these monomers. In general, any rubbery or glassy vinyl type monomer may be used which can be mixable with the organosiloxane.

Preferred vinyl-based polymer components of the first stage substrate of the polyorganosiloxane/polyvinyl-based graft copolymer comprise primarily alkenyl aromatic units, (meth)acrylate units or mixtures thereof. Especially preferred is polystyrene.

Typically, the vinyl-based component of the first stage co-homopolymer will be present in an amount of approximately 3 to 97 weight percent and correspondingly the organosiloxane component will be present in an amount of approximately 97 to 3 weight percent. Preferably, the vinyl-based component will comprise approximately 5 to 45 weight percent of the first stage of the co-homopolymerized substrate.

Most preferably, the vinyl polymer of the first stage comprises styrene and the ratio of organosiloxane to styrene is about 88 to 12.. Most preferably, the second stage comprises a styrene/acrylonitrile copolymer with a styrene to acrylonitrile ratio ranging from about 3 to 1 to about 1 to 1 and preferably 3 to 1 or 1 to 1. Most preferably, in a two stage composition, the ratio of first stage substrate to subsequent stage ranges from about 1 to 1 to about 7 to 3 and preferably 1 to 1 or 7 to 3.

If more than one subsequent stage is to be used, preferably the vinyl polymer of the first stage substrate will comprise styrene, the intermediate stage will comprise a copolymer of styrene/acrylonitrile, and the outermost stage will comprise polymerized methylmethacrylate. Most preferably, the ratio of the components of the first to the intermediate stages will be as immediately above and the ratio of first stage substrate to intermediate stage to third, outermost stage will be 70 to 15 to 15.

The cross-linker composition used in conjunction with the organosiloxane component of this modifier type can have the general formula:

$$R^2{}_n—Si(OR^1)_{4-n}$$

wherein n is 0, 1 or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxy alkyl functional radical. When $R^2$ is a vinyl, alkenyl, thio or acryloxy alkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The organosiloxane modifier products can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at an elevated temperature for about 10 minutes whereupon it may be filter washed. Commerical latex isolation techniques such as spray dryers may also be utilized.

The term EPDM modifier encompasses copolymers of ethylenically unsaturated olefins and non-conjugated diene polymers. Preferably EPDM modifiers encompass rubbery terpolymers comprising copolymerized units of ethylene and propylene and a non-conjugated diolefin and grafted derivatives thereof and preferably comprising an ethylene-propylene-diene terpolymer and grafted on derivatives thereof.

Ethylene-propylene-diene terpolymers are well known in the art and are rubbery terpolymers comprising copolymerized units of ethylene, propylene, and a non-conjugated diolefin.

The non-conjugated dienes useful in the preparation of these terpolymer elastomers may include chain non-conjugated dienes such as 1,4-hexadiene and also cyclic (especially bridged ring) non-conjugated dienes such as dicyclopentadiene, 5-methylene-2-norbornene, 5-ethylidene-2-norbornene, and 1,4-cyclooctadiene. Preferred is 5-ethylidene-2-norbornene.

Methods for the preparation of ethylene-propylene-diene terpolymers are described in U.S. Pat. Nos. 2,933,480, 3,000,866 and 3,000,867.

The grafted derivatives of these terpolymers are well known in the art as well. These resins may be characterized as resinous compositions of (A) polymerized alkenyl aromatic units and/or (B) polymerized acrylic units in combination with (C) a rubbery terpolymer comprising copolymerized units of ethylene and propylene and a non-conjugated diolefin, or as an ethylene-propylene-non-conjugated diene interpolymer grafted with the homopolymer or copolymer of monoethylenically unsaturated monomers as disclosed in U.S. Pat. No. 4,202,948, for example, styrene, styrene-acrylonitrile, methyl methacrylate, styrene-methyl-methacrylate, halostyrene, alpha-methylstyrene, p-methyl-styrene, acrylonitrile, methacrylonitrile, acrylic acid, methacrylic acid, the lower alkyl esters of acrylic acid and methacrylic acid, styrene maleic anhydride, and other alkyl ring substituted styrenes and acrylates including acrylates and alkacrylates and the like.

Preferably, these graft polymers are produced by polymerizing the resin forming alkenyl aromatic monomer and the acrylic monomer in the presence of a rubbery terpolymer of ethylene, propylene and a non-conjugated diolefin.

The non-conjugated dienes used in the preparation of the grafted terpolymer elastomers are as explained above. Such EPDM modifiers are more fully described in U.S. Pat. No. 4,626,572.

The term SEBS modifier is meant to include styrene-ethylene/butene-styrene block copolymers. These copolymers are three segment linear block copolymers with weight average molecular weights (as estimated in solution by gel permeation chromatography standardized with reference to and expressed as polystyrene) of between about 89,000±1,000 and about 238,000±4,000. The center segment is generally a hydrogenated polybutadiene and preferably a random copolymer of ethylene and butylene and the end segments are generally styrene. Such modifiers are more fully described in U.S. Pat. No. 4,709,982.

The term ABS modifier refers to impact modifiers which are well known to those skilled in the art and are represented principally by graft copolymers of vinyl cyanide-conjugated diolefin-alkenyl aromatic. They particularly comprise acrylonitrile-butadiene-styrene graft copolymers, but also encompass mixtures of analogous materials.

Particularly suitable ABS impact modifier can be produced according to the procedures as set forth in U.S. Pat. No. 4,764,563.

Such impact modifiers are prepared by grafting particular ratios of styrene and acrylonitrile on butadiene-based rubber substrates.

Specifically, these impact modifiers are ABS graft copolymer resins prepared by graft polymerizing particular ratios of styrene and acrylonitrile in the presence of particular styrene-butadiene rubber substrates.

The butadiene-based rubber substrates useful in preparing such impact modifiers are conventional copolymers of styrene and butadiene which optionally include up to 15 weight percent of acrylonitrile and/or an alkyl acrylate in which the alkyl group contains 4 or more carbon atoms, and comprise from 78 to 95 weight percent butadiene and from 22 to 5 weight percent styrene. The rubber substrate may further include up to 2 weight percent of additional copolymerizable cross-linking monomers such as divinylbenzene, triallylcyanurate or the like, up to 2 weight percent of chain transfer accents, such as tertiary dodecyl mercaptan, and up to 2 weight percent of graft enhancers such as alkyl methacrylate, diallylmaleate and the like. Diene polymer and copolymer rubbers are well known and widely employed commercially for a number of purposes. The preparation of such rubbers may be accomplished by any of a variety of processes well known and conventionally used. Particularly used are emulsion polymerization processes which provide the rubber in latex form suitable for use in subsequent graft polymerization processes.

These preferred ABS-type impact modifiers are prepared by graft polymerizing from about 40 to about 70, preferably from 47 to 61 parts by weight of a grafting monomer mixture comprising a monovinyl aromatic compound (MVA), such as styrene, alpha methyl styrene, p-methyl styrene or a combination thereof and an ethylenically unsaturated nitrile (EUN) such as acrylonitrile and/or methacrylonitrile in the presence of 100 parts by weight of butadiene-based rubber substrate. The impact modifier is thus a high rubber graft copolymer having a rubber content of from about 50 to about 85 weight percent, preferably from 62 to 78 weight percent and, correspondingly, a graft monomer component or superstrate of from 50 to 15, preferably from 48 to 22 weight percent.

The weight ratio of the MVA to the EUN in the grafting monomer mixture will be in the range of from 3:1 to 5:1, and preferably, from 3.8:1 to 4.2:1.

This graft polymerization of the MVA/EUN monomer mixture in the presence of the rubbery substrate may be carried out by any of the graft polymerization processes well known and widely used in the polymerization art for preparing ABS resins, including emulsion, suspension, and bulk processes. Typical of such processes are emulsion graft polymerization processes wherein the grafting monomers are added together with surfactants and chain transfer agents as desired, to an emulsion latex of the rubbery substrate and polymerized using an initiator. The initiator may be any of the commonly used free-radical generators including peroxides such as dicumyl peroxide or azo initiators such as azobisisobutyronitrile. Alternatively, any of the variety of redox polymerization catalysts such as the combination of cumene hydroperoxide with ferrous sulfate and sodium formaldehyde sulfoxylate which are well known and widely used in such processes may be employed. The graft polymerization process used in the preparation of the ABS impact modifiers, as well as those processes used in coagulating and isolating the ABS impact modifier for further use, are thus well known and conventional, and the application of such processes to the preparation of the ABS impact modifiers for further use, are thus well known, conventional, and apparent to those skilled in the art.

The ABS impact modifier suitable for use in the present invention may also comprise a styrenic polymer which comprises a rigid portion and a rubber portion. The rigid portion is formed from at least two ethylenically unsaturated monomers, one of which comprises styrene and/or substituted styrene. Preferred substituted styrenes include, but are not limited to, halogen-substituted styrene, particularly wherein the halogen is substituted on the aromatic ring; alpha-methyl styrene and para-methyl styrene. The other ethylenically unsaturated monomer which is used in forming the rigid portion may be selected from acrylonitrile, substituted acrylonitriles, acrylates, alkyl-substituted acrylates, methacrylates, alkyl-substituted methacrylates, and ethylenically unsaturated carboxylic acids, diacids, dianhydrides, acid esters, diacid esters, amides, imides and alkyl- and aryl-substituted imides. Preferably, the second monomer which is used to form the rigid portion is selected from the group consisting of acrylonitrile, methacrylonitrile, alkyl methacrylates, maleic anhydride, maleimide, alkyl maleimides, aryl maleimides, and mixtures thereof. It is further preferred that the rigid portion is formed from about 60 to about 95 weight percent, and more preferably 60 to 80 weight percent of the styrene and/or substituted styrene monomers and from about 5 to about 40 weight percent and more preferably 20 to 40 weight percent, of the second monomer.

The rubber portion may be formed from polymers or copolymers of one or more conjugated dienes, copolymers of conjugated dienes and non-diene vinyl monomers, alkyl acrylate polymers, and copolymers of ethylenically unsaturated olefins and non-conjugated diene polymers (EPDM) rubbers as previously described above. A preferred rubber portion includes polybutadiene.

The styrenic polymer component may be formed such that the rigid portion is grafted to the rubber portion. Alternatively, the rigid portion may be blended with the rubber portion. When the rigid portion is blended with the rubber portion, it is preferred that the rubber portion has been previously grafted with one or more grafting monomers. Accordingly, the styrenic polymer component may be so produced by any method known in the art, for example, emulsion, bulk, mass or suspension polymerization processes. It is preferred that the styrenic polymer component contains from about 10 to 90 weight percent of the rubber portion and from about 10 to 90 weight percent of the rigid portion, based on the rubber portion and the rigid portion. More preferably, the styrenic polymer component comprises from about 40 to about 80 weight percent of the rubber portion and from about 20 to about 60 weight percent of the rigid portion, based on the rubber portion and the rigid portion.

Most preferably, the ABS modifier will comprise a terpolymer of acrylonitrile (AN), butadiene (BD) and styrene (S) having a S to AN ratio of from about 3.5:1 to 2.5:1 and most preferably 3.5:1, 3.0:1 or 2.5:1, and a BD to S/AN ratio of 7:3.

Suitable commercially available ABS modifiers are available under the tradename BLENDEX® from General Electric Company. It is preferred at present to use BLENDEX® 338, S to AN ratio of 3.0:1.0.

The modifiers (B) of the present invention typically comprise from about 5 to 25 parts by weight based upon 100 parts by weight of the polyester and the modifier combined and most preferably from about 15 to about 20 parts by weight, and the polyester resin correspondingly comprises from about 95 to about 75 parts by weight, and preferably from about 85 to about 80 parts by weight of polyester and modifier combined. Most preferably, the modifier comprises 15 parts by weight and the polyester resin comprises 85 parts by weight based upon 100 parts by weight of polyester and modifier combined.

Special mention is made of blends comprising the compositions of the present invention. Additionally, the compositions of the present invention may be molded, extruded, or thermoformed into articles by conventional methods known to one of ordinary skill in the art.

Conventional processing for mixing thermoplastic polymers can be used for the manufacture of compositions within the present invention. For example, the compositions can be manufactured using any suitable mixing equipment, co-kneaders, or extruders under conditions known to one of ordinary skill in the art.

Additionally, additives such as antioxidants, nucleating agents such as talc and the like, other stabilizers including but not limited to UV stabilizers, reinforcing fillers such as talc, glass fibers and the like, flame retardants, pigments or combinations thereof may be added to the compositions of the present invention.

DESCRIPTION OF THE PREFERRED EMBODIMENTS

The following examples illustrate the invention without limitation. All parts are given by weight unless otherwise indicated. Impact strengths are represented as notched and unnotched Izods according to ASTM-D-256 or ductile/brittle transition temperatures. Tensile properties are measured by ASTM-D-638 as tensile elongation and tensile strength, and flexural properties are measured by ASTM-D-790 as flexural strength and flexural modulus. Heat sag is represented according to ASTM-D-3769-81.

EXAMPLE 1

A well mixed dry blend of 79.0 parts of poly(1,4-butylene-trans-1,4-cyclohexanedicarboxylate) (PBCD) (melt viscosity 3300 poise at 250° C.), 20.0 parts of an ASA modifier (polybutyl acrylate elastomer-styrene/acrylonitrile interpolymer-Geloy® XSAN-General Electric Company-Pittsfield, Mass.) and 1.0 part of a stabilizer package was extruded on a 2.5" HPM extruder operating at 100 rpm with barrel zones at 250° C.

The extruded blend was observed to be homogeneous. Test parts were molded on a 3.5 oz. Van Dorn molder with barrel temperatures at 250° C. and mold temperature at 75° C. and with a 30 second cycle. Properties are summarized in Table 1.

EXAMPLE 2

The procedure of Example 1 was followed substituting a dry blend of 79.0 parts of PBCD (melt viscosity 3300 poise at 250° C.), 20.0 parts of an ASA modifier (polybutyl acrylate elastomer-styrene/acrylonitrile-additional styrene/acrylonitrile interpolymer-Geloy® 1120-General Electric Company), and 1.0 part of a stabilizer package.

The extruded blend was observed to be homogeneous. Properties are summarized in Table 1.

EXAMPLE 3

The procedure of Example 1 was followed substituting a dry blend of 78.5 parts of PBCD (melt viscosity 3300 poise at 250° C.), 20.0 parts of an ASA modifier (polybutyl acrylate elastomer-styrene/acrylonitrile interpolymer—Geloy® XSAN—General Electric Company), 1.0 part of a stabilizer package, and 0.5 part of a nucleating agent.

The extruded blend was homogeneous. Properties are summarized in Table 1.

EXAMPLE 4

The procedure of Example 1 was followed substituting a dry blend of 78.5 parts of PBCD (melt viscosity 3300 poise at 250° C.), 20.0 parts of an ASA modifier (polybutyl acrylate-styrene/acrylonitrile-additional styrene/acrylonitrile interpolymer-Geloy® 1120-General Electric Company), 1.0 part of a stabilizer package, and 0.5 part of a nucleating agent.

The extruded blend was homogeneous. Properties are summarized in Table 1.

EXAMPLE 5

The procedure of Example 1 was followed substituting a dry blend of 84.0 parts of PBCD (melt viscosity 5000 poise at 250° C.), 15.0 parts of diene-based core-shell multi-stage polymer modifier (core=polymerized butadiene, styrene, methylmethacrylate and divinylbenzene-second stage shell= polymerized styrene-outer shell=polymerized methylmethacrylate and 1,3-butylene glycol dimethacrylate-ACRYLOID® KM 653, also known as PARALOID® EXL 3691-Rohm & Haas Company-Philadelphia, Pa.) and 1.0 part of a stabilizer package.

The extruded blend was observed to be homogeneous. Properties are summarized in Table 1.

COMPARATIVE EXAMPLE 5A*

The procedure of Example 1 was followed substituting 00.0 parts of PBCD (melt viscosity 5000 poise at 250° C.) for the dry blend.

Properties are summarized in Table 1.

EXAMPLE 6

The procedure of Example 5 was followed substituting an acrylate-based core-shell multi-stage polymer modifier (core=polybutylacrylate-shell=methylmethacrylate-ACRYLOID® KM 330, also known as PARALOID® EXL 3330-Rohm & Haas Company) for the modifier.

Properties are summarized in Table 1.

EXAMPLE 7

The procedure of Example 5 was followed substituting an EPDM modifier (EPDM-S/AN-Royaltuf® 372-P-Uniroyal Middlebury, Conn.) for the modifier.

Properties are summarized in Table 1.

EXAMPLE 8

The procedure of Example 5 was followed substituting an organosiloxane-based modifier with a styrene/acrylonitrile outer most stage (SIM-S/AN, SIM=Si/St, Si:St=88:12, S:AN=3:1, Si/St:S/AN=70:30) for the modifier.

Properties are summarized in Table 1.

EXAMPLE 9

The procedure of Example 5 was followed substituting an organosiloxane-based modifier with a methylmethacrylate outer most stage (SIM-MMA) for the modifier.

Properties are summarized in Table 1.

EXAMPLE 10

The procedure of Example 5 was followed substituting an ASA modifier (polybutyl acrylate elastomer-styrene interpolymer-Geloy® XS-General Electric Company) for the modifier.

Properties are summarized in Table 1.

EXAMPLE 11

The procedure of Example 5 was followed substituting an ASA modifier (polybutyl acrylate elastomer-styrene/acrylonitrile interpolymer-Geloy® XSAN-General Electric Company) for the modifier.

Properties are summarized in Table 1.

EXAMPLE 12

The procedure of Example 5 was followed substituting an SEBS modifier (styrene-hydrogenated polybutadiene-styrene block copolymer-weight average molecular weight= 238,000±4,000-Kraton® G1651-Shell Chemical Company-Houston, Tex.) for the modifier.

Properties are summarized in Table 1.

EXAMPLE 13

The procedure of Example 5 was followed substituting an ABS modifier (BLENDEX® 338-General Electric Company) for the modifier.

Properties are summarized in Table 1.

EXAMPLE 14

The procedure of Example 1 was followed substituting a dry blend of 83.55 parts of PBCD (melt viscosity 5000 poise at 250° C.), 15.0 parts of an ABS modifier (BLENDEX® 338-General Electric Company), and 1.45 parts of a stabilizer package.

Properties are summarized in Table 1.

EXAMPLE 15

The procedure of Example 1 was followed substituting a dry blend of 81.98 parts of PBCD (melt viscosity 5000 poise at 250° C.), 14.72 parts of an ABS modifier (BLENDEX® 338-General Electric Company), 1.42 parts of a stabilizer package and 1.88 parts of green pigment.

Properties are summarized in Table 1.

Examples 1–15 illustrate the excellent impact strength even at low temperatures and the excellent tensile properties that various compositions according to the present invention possess.

TABLE 1

| Example | \multicolumn{15}{c}{PBCD Modifications} |
|---|---|---|---|---|---|---|---|---|---|---|---|---|---|---|---|
|  | 1 | 2 | 3 | 4 | 5 | 5A* | 6 | 7 | 8 | 9 | 10 | 11 | 12 | 13 | 14 | 15 |
| Composition | | | | | | | | | | | | | | | | |
| $PBCD^A$ | 79 | 79 | 78.5 | 78.5 | — | — | — | — | — | — | — | — | — | — | — | — |
| $PBCD^B$ | — | — | — | — | 84 | 100 | 84 | 84 | 84 | 84 | 84 | 84 | 84 | 84 | 83.55 | 81.98 |
| Modifier | $20^D$ | $20^E$ | $20^D$ | $20^E$ | $15^F$ | — | $15^G$ | $15^H$ | $15^I$ | $15^J$ | $15^K$ | $15^D$ | $15^L$ | $15^M$ | $15^M$ | $14.7^M$ |
| Stabilizer | 1 | 1 | 1 | 1 | 1 | — | 1 | 1 | 1 | 1 | 1 | 1 | 1 | 1 | 1.45 | 1.42 |
| Nucleating Agent | — | 0.5 | 0.5 | — | — | — | — | — | — | — | — | — | — | — | — | — |
| $Pigment^C$ | — | — | — | — | — | — | — | — | — | — | — | — | — | — | — | 1.88 |
| Properties | | | | | | | | | | | | | | | | |
| Tensile Elongation (%) | 270 | 260 | — | — | 280 | 250 | 250 | 350 | 300 | 260 | 520 | 280 | 380 | 305 | 305 | 288 |
| Tensile Strength (psi) | 4200 | 4500 | — | — | 4700 | 4000 | 4100 | 5000 | 3700 | 3900 | 4800 | 4200 | 4400 | 5000 | 3200 | 3200 |
| Flexural Strength (psi) | 3500 | 6700 | — | — | — | — | — | — | — | — | — | — | — | — | 3860 | 4280 |
| Flexural Modulus (Kpsi) | 78 | 172 | — | — | 80 | 85 | 70 | 100 | 75 | 80 | 55 | 65 | 75 | 71 | 76.1 | 89.36 |

TABLE 1-continued

| Example | PBCD Modifications | | | | | | | | | | | | | | |
|---|---|---|---|---|---|---|---|---|---|---|---|---|---|---|---|
| | 1 | 2 | 3 | 4 | 5 | 5A* | 6 | 7 | 8 | 9 | 10 | 11 | 12 | 13 | 14 | 15 |
| Unnotched Izod @ | | | | | | | | | | | | | | | | |
| RT (fpi) | NB | NB | — | — | — | — | — | — | — | — | — | — | — | — | 22.9 | 26.4 |
| 0° C. | — | — | — | — | — | — | — | — | — | — | — | — | — | — | 23.8 | 23.7 |
| −32° C. | — | — | — | — | — | — | — | — | — | — | — | — | — | — | 21.1 | 22.1 |
| −40° C. | — | — | — | — | — | — | — | — | — | — | — | — | — | — | 12.9 | 20.2 |
| Notched Izod (fpi) @ | | | | | | | | | | | | | | | | |
| RT | 17.3 | 13.1 | — | — | 11.0 | 0.45 | 15.2 | 15.0 | 14.0 | 8.5 | 16.9 | 17.1 | 17.9 | 17.4 | 18.0 | 19.0 |
| 0° C. | — | — | — | — | 2.9 | — | 14.6 | 1.2 | 7.0 | 4.8 | 3.0 | 14.5 | 17.1 | 14.2 | 17.5 | 15.2 |
| −10° C. | — | — | — | — | 1.1 | — | 2.4 | 1.1 | 5.8 | 1.9 | 2.1 | 10.4 | 2.4 | 13.3 | — | — |
| −20° C. | — | — | — | — | — | — | — | — | 4.8 | — | — | 2.4 | — | — | — | — |
| −30° C. | — | — | — | — | 1.2 | — | 1.7 | 0.9 | 2.5 | 2.0 | 1.7 | 2.1 | 2.5 | 12.4 | — | — |
| −32° C. | — | — | — | — | — | — | — | — | — | — | — | — | — | — | 15.0 | 10.3 |
| −40° C. | — | — | — | — | — | — | — | — | — | — | — | — | — | 8.7 | 13.9 | 4.3 |
| −50° C. | — | — | — | — | — | — | — | — | — | — | — | — | — | 1.3 | — | — |
| Ductile/Brittle Transition Temperature - determined by Notched Izod (°C.) | — | — | — | — | >0 | >RT | −5 | >0 | 0 | RT | >0 | −15 | −5 | −40 | — | — |
| Melt Viscosity (poise at 250° C.) | 4300 | 4100 | — | — | 4100 | 5000 | 5000 | 4150 | 2900 | 3250 | 3100 | 3900 | — | 8900 | 6900 | 6360 |
| DSC Results | | | | | | | | | | | | | | | | |
| Molded Part | | | | | | | | | | | | | | | | |
| Peak Melt Temp 0° C. | 162.0 | 162.2 | — | — | — | — | — | — | — | — | — | — | — | — | — | — |
| Heat of Fusion (J/g) | 22.8 | 27.0 | — | — | — | — | — | — | — | — | — | — | — | — | — | — |
| Reheated Sample | | | | | | | | | | | | | | | | |
| Peak Melt Temp (°C.) | 160.8 | 160.3 | — | — | — | — | — | — | — | — | — | — | — | — | — | — |
| Heat of Fusion (J/g) | 20.5 | 22.7 | — | — | — | — | — | — | — | — | — | — | — | — | — | — |
| Heat Sag | | | | | | | | | | | | | | | | |
| @ 180° F. (mm) as Molded | 21 | 35 | 19 | 13 | 19 | 16 | 17 | 22 | 18 | 19 | 17 | 17 | — | 15 | — | — |
| After Annealing @ 200° F. (mm) | 10 | 15 | 14 | 8 | — | — | — | — | — | — | — | — | — | — | — | — |

$^A$poly(1,4-butylene-trans-1,4-cyclohexanedicarboxylate) - melt viscosity 3300 poise at 250° C.
$^B$poly(1,4-butylene-trans-1,4-cyclohexanedicarboxylate) - melt viscosity 5000 poise at 250° C.
$^C$green pigment.
$^D$polybutyl acrylate elastomer-styrene/acrylonitrile interpolymer - (Geloy ® XSAN - General Electric Co. - Pittsfield, MA).
$^E$polybutyl acrylate elastomer-styrene/acrylonitrile - styrene acrylonitrile interpolymer - (Geloy ® 1120 - General Electric Co. - Pittsfield, MA).
$^F$core-shell multi-stage polymer - core = polymerized butadiene and styrene, methylmethacrylate and divinylbenzene - second stage/shell = polymerized styrene - outer shell = polymerized methylmethacrylate and 1,3-butylene glycol dimethacrylate - (ACRYLOID ® KM 653, also known as PARALOID ® EXL 3691 - Rohm & Haas Co. - Philadelphia, PA).
$^G$core-shell multi-stage polymer - core = polymerized butylacrylate - shell = polymerized methylmethacrylate - (ACRYLOID ® KM 330, also known as PARALOID ® EXL 3330 - Rohm & Haas Co. - Philadelphia, PA).
$^H$EPDM with SAN graft - Royaltuf ® 372-P - Uniroyal - Middlebury, CT).
$^I$SIM-S/AN multi-stage polymer - SIM = Si/St - Si:St = 88:12 - S:AN = 3:1 Si/St:S/N = 70:30.
$^J$SIM-MMA multi-stage polymer.
$^K$poly(butylacrylate elastomer - styrene/acrylonitrile - styrene interpolymer - (Geloy ® XS - General Electric Co. Pittsfield, MA).
$^L$SEBS modifier-styrene-hydrogenated polybutadiene-styrene block copolymer-weight average molecular weight = 238,000 ± 4000 (Kraton ® G1651 - Shell Chemical Co. - Houston, TX).
$^M$ABS modifier (BLENDEX ® 338 - General Electric Co. - Pittsfield, MA).
"—" Value not determined.

EXAMPLE 16

A well mixed dry blend of 85.0 parts of poly(1,4-butylene-trans-1,4-cyclohexanedicarboxylate) (PBCD) and 15.0 parts of an ABS modifier having a S:AN ratio of 4.0:1.0 and a BD:SAN ratio of 50:50 was extruded, molded and tested as in Example 1.

Ductile/brittle transition temperature (D/B) was determined by Notched Izod to be 0° C. Properties are summarized in Table 2.

EXAMPLE 17

The procedure of Example 16 was followed substituting an ABS modifier having a S:AN ratio of 3.5:1.0 and a BD:SAN ratio of 50:50.

D/B was determined to be 0° C. Properties are summarized in Table 2.

EXAMPLE 18

The procedure of Example 16 was followed substituting an ABS modifier having a S:AN ratio of 3.0:1.0 and a BD:SAN ratio of 50:50.

D/B was determined to be 0° C. Properties are summarized in Table 2.

EXAMPLE 19

The procedure of Example 16 was followed substituting an ABS modifier having a S:AN ratio of 2.5:1.0 and a BD:SAN ratio of 50:50.

D/B was determined to be 0° C. Properties are summarized in Table 2.

EXAMPLE 20

The procedure of Example 16 was followed substituting an ABS modifier having a S:AN ratio of 2.3:1.0 and BD:SAN ratio of 50:50.

D/B was determined to be 0° C. Properties are summarized in Table 2.

EXAMPLE 21

The procedure of Example 16 was followed substituting an ABS modifier having a S:AN ratio of 1.9:1.0 and a BD:SAN ratio of 50:50.

D/B was determined to be 0° C. Properties are summarized in Table 2.

EXAMPLE 22

The procedure of Example 16 was followed substituting an ABS modifier having a S:AN ratio of 3.5:1.0 and a BD:SAN ratio of 70:30.

D/B was determined to be –45° C. Properties are summarized in Table 2.

EXAMPLE 23

The procedure of Example 16 was followed substituting an ABS modifier having a S:AN ratio of 3.0:1.0 and a BD:SAN ratio of 70:30.

D/B was determined to be –45° C. Properties are summarized in Table 2.

EXAMPLE 24

The procedure of Example 16 was followed substituting an ABS modifier having a S:AN ratio of 2.5:1.0 and a BD:SAN ratio of 70:30.

D/B was determined to be –35° C. Properties are summarized in Table 2.

Examples 16–24 indicate that an ABS modifier having a S:AN ratio of 3.0:1.0 and a BD:SAN ratio of 70:30 is close to the optimum for the modification of PBCD. Low S:AN ratio may be good for weatherability, but it is detrimental to low temperature impact strength.

EXAMPLE 26

The procedure of Example 25 was followed substituting a dry blend of 85.0 parts of poly(1,4-butylene-trans-1,4-cyclohexane dicarboxylate) (PBCD) and 20.0 parts of an organosiloxane modifier (Si/St-S/AN (Si:St=88:12-S:AN=3:1-Si/St:S/AN=70:30)).

D/B was determined to be –30° C. Properties are summarized in Table 3.

EXAMPLE 27

The procedure of Example 26 was followed substituting an organosiloxane modifier Si/St-S/AN-MMA (Si:St=88:12-S:AN=1:1-Si/St:S/AN:MMA=70:15:15)).

D/B was determined to be above –30° C. Properties are summarized in Table 3.

EXAMPLE 28

The procedure of Example 26 was followed substituting an organosiloxane modifier (Si/St-S/AN (Si:St=88:12-S:AN-3:1-Si/St:S/AN=70:30)) (second sample).

D/B was determined to be 0° C. Properties are summarized in Table 3.

Organosiloxane modifiers having a low S:AN ratio gave better color retention but worse impact properties similar to the S:AN ratio effect in ABS modifiers.

TABLE 3

Optimization of Organosiloxane Modifiers for PBCD Performance

| Example | 25 | 26 | 27 | 28 |
|---|---|---|---|---|
| PBCD[A] | 80.0 | 85.0 | 85.0 | 85.0 |
| Organosiloxane Modifier | 20.0 | 15.0 | 15.0 | 15.0 |
| Si:St ratio | 88:12 | 88:12 | 88:12 | 88:12 |
| S:AN ratio | 3:1 | 3:1 | 1:1 | 3:1 |
| Si/St:S/AN:MMA ratio | 50:50:0 | 70:30:0 | 70:15:15 | 70:30:0 |
| Ductile/Brittle Transition Temperature determined by Notched Izod (°C.) | –30 | –30 | >–30 | 0 |

[A]poly(1,4-butylene-trans-1,4-cyclohexane dicarboxylate).

TABLE 2

Optimization of ABS Modifier for PBCD Impact Performances

| Example | 16 | 17 | 18 | 19 | 20 | 21 | 22 | 23 | 24 |
|---|---|---|---|---|---|---|---|---|---|
| PBCD[A] | 85.0 | 85.0 | 85.0 | 85.0 | 85.0 | 85.0 | 85.0 | 85.0 | 85.0 |
| ABS Modifier | 15.0 | 15.0 | 15.0 | 15.0 | 15.0 | 15.0 | 15.0 | 15.0 | 15.0 |
| S:AN Ratio | 4.0:1.0 | 3.5:1.0 | 3.0:1.0 | 2.5:1.0 | 2.3:1.0 | 1.9:1.0 | 3.5:1.0 | 3.0:1.0 | 2.5:1.0 |
| BD:SAN Ratio | 50:50 | 50:50 | 50:50 | 50:50 | 50:50 | 50:50 | 70:30 | 70:30 | 70:30 |
| Ductile/Brittle Transition Temperature determined by Notched Izod (°C.) | 0 | 0 | 0 | 0 | 0 | 0 | –45 | –45 | –35 |

[A]poly(1,4-butylene-trans-1,4-cyclohexane dicarboxylate).

EXAMPLE 25

A well mixed dry blend of 80.0 parts of poly(1,4-butylene-trans-1,4-cyclohexane dicarboxylate) (PBCD) and 20.0 parts of an organosiloxane modifier (Si/St-S/AN (Si:St=88:12-S:AN=3:1-Si/St:S/AN=50:50)) was extruded, molded and tested as in Example 1.

D/B was determined to be –30° C. Properties are summarized in Table 3.

EXAMPLE 29

95.0 parts of a blend prepared by the procedure of Example 14 were mixed with 5.0 parts of glass reinforcing fibers. The resultant blend was extruded, molded, and tested as in Example 1.

Properties are summarized in Table 4.

COMPARATIVE EXAMPLE 29A*

95.0 parts of poly(1,4-butylene-trans-1,4-cyclohexane dicarboxylate) (PBCD) (melt viscosity 5000 poise at 250° C.) were mixed with 5.0 parts of glass reinforcing fibers. The resultant blend was extruded, molded and tested as in Example 1.

Properties are summarized in Table 4.

EXAMPLE 30

90.0 parts of a blend prepared by the procedure of Example 14 were mixed with 10.0 parts of glass reinforcing fibers. The resultant blend was extruded, molded and tested as in Example 1.

Properties are summarized in Table 4.

COMPARATIVE EXAMPLE 30A*

90.0 parts of poly(1,4-butylene-trans-1,4-cyclohexane dicarboxylate) (PBCD) (melt viscosity 5000 poise at 250° C.) were mixed with 10.0 parts of glass reinforcing fibers. The resultant blend was extruded, molded, and tested as in Example 1.

Properties are summarized in Table 4.

EXAMPLE 31

90.0 parts of a blend prepared by the procedure of Example 15 were mixed with 10.0 parts of glass reinforcing fibers. The resultant blend was extruded, molded, and tested as in Example 1.

Properties are summarized in Table 4.

EXAMPLE 32

85.0 parts of a blend prepared by the procedure of Example 14 were mixed with 15.0 parts of glass reinforcing fibers. The resultant blend was extruded, molded, and tested as in Example 1.

Properties are summarized in Table 4.

COMPARATIVE EXAMPLE 32A*

85.0 parts of poly(1,4-butylene-trans-1,4-cyclohexane dicarboxylate) (PBCD) (melt viscosity 5000 poise at 250° C.) were mixed with 15.0 parts of glass reinforcing fibers. The resultant blend was extruded, molded, and tested as in Example 1.

Properties are summarized in Table 4.

EXAMPLE 33

70.0 parts of a blend prepared by the procedure of Example 14 were mixed with 30.0 parts of glass reinforcing fibers. The resultant blend was extruded, molded and tested as in Example 1.

Properties are summarized in Table 4.

EXAMPLE 34

93.0 parts of a blend prepared by the procedure of Example 14 were mixed with 5.0 parts of glass reinforcing fibers and 2.0 parts of talc. The resultant blend was extruded, molded and tested as in Example 1.

Properties are summarized in Table 4.

Examples 29–34 demonstrate the excellent impact and tensile properties of various reinforced compositions according to the present invention.

TABLE 4

Reinforced PBCD Compositions

| Example | 29 | 29* | 30 | 30A* | 31 | 32 | 32A* | 33 | 34 |
|---|---|---|---|---|---|---|---|---|---|
| Composition | | | | | | | | | |
| PBCD Blend[A] | 95.0 | — | 90.0 | — | — | 85.0 | — | 70.0 | 93.0 |
| PBCD Blend[B] | — | — | — | — | 90.0 | — | — | — | — |
| PBCD[C] | — | 95.0 | — | 90.0 | — | — | 85.0 | — | — |
| Reinforcing Filler[D] | 5.0 | 5.0 | 10.0 | 10.0 | 10.0 | 15.0 | 15.0 | 30.0 | 5.0 |
| Nucleating Agent[E] | — | — | — | — | — | — | — | — | 2.0 |
| Properties | | | | | | | | | |
| Tensile Strength (psi) | 4340 | 5620 | 5720 | 6870 | 4630 | 7010 | 8330 | 10000 | 4385 |
| Flexural Strength (psi) | 6060 | 7525 | 8400 | 9670 | 6720 | 10870 | 11890 | 14600 | 6645 |
| Flexural Modulus (kpsi) | 140.3 | 161.9 | 205.5 | 229.3 | 172 | 278 | 298.5 | 490 | 167 |
| Notched Izod (fpi) @ | | | | | | | | | |
| RT | 5.7 | 1.0 | 5.4 | 2.0 | 5.1 | 5.7 | 3.2 | 5.0 | 4.2 |
| −30° C. | 2.4 | 0.7 | 2.5 | 1.2 | 1.9 | 2.6 | 1.6 | — | 1.6 |
| Unnotched Izod (fpi) @ | | | | | | | | | |
| RT | 17.2 | 21.9 | 15.0 | 16.4 | 14.9 | 14.4 | 16.9 | 16.7 | 13.8 |
| −30° C. | 11.9 | 12.4 | 12.1 | 13.6 | 12.4 | 12.5 | 14.6 | — | 10.4 |

[A]83.55 parts PBCD (poly(1,4-butylene-trans-1,4-cyclohexane dicarboxylate) (melt viscosity 5000 poise @ 250° C.), 15.0 parts ABS modifier (BLENDEX ® 338 - General Electric Company), and 1.45 parts of a stabilizer package (Example 14).
[B]81.98 parts PBCD (poly(1,4-butylene-trans-1,4-cyclohexane dicarboxylate) (melt viscosity 5000 poise @ 250° C.), 14.72 parts ABS modifier (BLENDEX ® 338 - General Electric Company), 1.42 parts of a stabilizer package, and 1.88 parts of green pigment (Example 15).
[C]poly(1,4-butylene-trans-1,4-cyclohexane dicarboxylate) - melt viscosity 5000 poise at 250° C.
[D]glass reinforcing fibers.
[E]talc.

EXAMPLE 35

A well mixed dry blend of 82.05 parts of a copolymer of poly(cis-and trans-1,4-cyclohexanedimethylene-trans-1,4-cyclohexanedicarboxylate) (cis:trans=25:75) (PCCD), 15.0 parts of an ABS modifier (BLENDEX® 338 -General Electric Company), 0.5 part of a nucleating agent, 1.45 parts of a stabilizer package, and 1.0 part of a light blue pigment blend was extruded on a single screw 2.5" HPM extruder having a barrel temperature of 500° F. The resultant pellets were molded into test pieces on a 3.5 oz. Van Dorn injection molding machine set at 500° F. barrel temperature and 150° F. mold temperature.

The product showed poor distribution of the rubber. Properties are summarized in Table 5.

COMPARATIVE EXAMPLE 35A*

The procedure of Example 35 was followed substituting a dry blend of 97.5 parts of PCCD (25:75 copolymer of cis- and trans-1,4-cyclohexanedimethylene-trans-1,4-cyclohexanedicarboxylate), and 2.0 parts of an ionomer (Surlyn® 8940-E. I. DuPont de Nemours & Co. Wilmington, Del.), and 0.5 part of a nucleating agent.

Properties are summarized in Table 5.

EXAMPLE 36

Extruded pellets were prepared by the procedure of Example 35, were reextruded on a Werner Pfleiderer twin screw extruder, were molded and were tested as in Example 35.

Properties are summarized in Table 5.

EXAMPLE 37

A well mixed dry blend of 80.6 parts of PCCD (25:75 copolymer of cis- and trans-1,4-cyclohexanedimethylene-trans-1,4-cyclohexanedicarboxylate-melt viscosity 3000 poise at 50° C.), 15.0 parts of an ABS modifier (BLENDEX® 338-General Electric Company), 4.0 parts of talc and 0.4 part of a stabilizer package was extruder on a Werner Pfleiderer twin screw extruder, molded on a 3.5 oz. Van Dorn injection molding machine, set at 500° F. barrel temperature at 150° F. mold temperature and tested as in Example 1.

Properties are summarized in Table 5.

COMPARATIVE EXAMPLE 37A*

The procedure of Example 37 was followed substituting a dry blend of 96.0 parts of PCCD (25:75 copolymer of cis- and trans-1,4-cyclohexanedimethylene-trans-1,4-cyclohexanedicarboxylate) and 4.0 parts of talc.

Properties are summarized in Table 5.

EXAMPLE 38

The procedure of Example 37 was followed substituting a diene-based core-shell multi-stage polymer modifier (core=polymerized butadiene, styrene, methylmethacrylate and divinylbenzene-second stage shell=polymerized styrene outer shell=polymerized methylmethacrylate and 1,3-butylene glycol dimethacrylate-ACRYLOID® KM653, also known as PARALOID® EXL 3691-Rohm & Haas Company-Philadelphia, Pa.) for the ABS modifier.

Properties are summarized in Table 5.

EXAMPLE 39

The procedure of Example 37 was followed substituting an SEBS modifier (styrene-hydrogenated polybutadiene-styrene block copolymer-weight average molecular weight= 238,000±4,000-Kraton® G1651-Shell Chemical Company-Houston, Tex.) for the ABS modifier.

Properties are summarized in Table 5.

Examples 35–39 illustrate the excellent impact strength and the excellent tensile properties that various compositions according to the present invention possess.

Examples 37–39 illustrate the effect of the addition of optional fillers.

TABLE 5

Impact Modified PCCD Compositions

| Example | 35 | 35A* | 36 | 37 | 37A* | 38 | 39 |
|---|---|---|---|---|---|---|---|
| Composition | | | | | | | |
| PCCD$^A$ | 82.05 | 97.5 | 82.05 | — | 96.0 | — | — |
| PCCD$^B$ | — | — | — | 80.6 | — | 80.6 | 80.6 |
| Modifier | 15.0$^D$ | — | 15.0$^D$ | 15.0$^D$ | — | 15.0$^E$ | 15.0$^F$ |
| Stabilizer | 1.45 | — | 1.45 | 0.4 | — | 0.4 | 0.4 |
| Nucleating Agent | 0.5 | 0.5 | 0.5 | — | — | — | — |
| Lt. Blue Pigment Blend | 1.0 | — | 1.0 | — | — | — | — |
| Ionomer$^C$ | — | 2.0 | — | — | — | — | — |
| Talc | — | — | — | 4.0 | 4.0 | 4.0 | 4.0 |
| Properties | | | | | | | |
| Tensile Elongation | | | | | | | |
| as molded (%) | 90 | 135 | 25 | 197 | 25 | 280 | 300 |
| annealed$^G$ (%) | — | — | — | 23 | — | 28 | 25 |
| Tensile Strength | | | | | | | |
| as molded (psi) | 5350 | 5470 | 4800 | 4100 | 5900 | 3900 | 3500 |
| annealed (psi)$^G$ | — | — | — | 5300 | — | 5200 | 4700 |
| Flexural Strength | | | | | | | |
| as molded (psi)$^G$ | 6900 | 8000 | 8100 | 6800 | 8500 | 6300 | 5700 |
| annealed (psi)$^G$ | 8400 | 10100 | — | 8200 | 11200 | 8000 | 7400 |
| Flexural Modulus | | | | | | | |
| as molded (Kpsi) | 129 | 161 | 146 | 142 | 198 | 129 | 98 |

TABLE 5-continued

Impact Modified PCCD Compositions

| Example | 35 | 35A* | 36 | 37 | 37A* | 38 | 39 |
|---|---|---|---|---|---|---|---|
| annealed (Kpsi)$^G$ | 161 | 171 | — | 165 | 218 | 154 | 135 |
| Unnotched Izod @ RT as molded (fpi) | 23.7 | 19.7 | 13.3 | 25.7 | 20.5 | 25.7 | 23.2 |
| Notched Izod @ | | | | | | | |
| RT as molded (fpi) | 3.9 | 1.1 | 1.6 | 15.8 | 0.6 | 15.7 | 15.8 |
| annealed (fpi)$^G$ | — | — | — | 2.2 | — | 3.6 | 2.8 |
| Falling Dart Impact | | | | | | | |
| as molded at | | | | | | | |
| max. load (ft-lbs) | 16.6 | 19.7 | 9.4 | 16.5 | 20.5 | 17.4 | 16.5 |
| total (ft-lbs) | 22.5 | 30.1 | 20.8 | 25.1 | 28.2 | 24.4 | 25.7 |
| annealed$^G$ | | | | | | | |
| max. load (ft-lbs) | — | — | — | 14.0 | — | 17.0 | 16.0 |
| total (ft-lbs) | — | — | — | 18.0 | — | 24.0 | 24.0 |
| Melt Viscosity (p) at 250° C. | 4500 | 3500 | — | 6300 | 2700 | 6300 | 4200 |
| DSC Results | | | | | | | |
| Tch (°C.)$^H$ | — | — | — | 119 | — | 123 | 123 |
| Hch (J/g)$^I$ | — | — | — | 16 | — | 15 | 16 |
| Tm (°C.)$^J$ | — | — | — | 224 | — | 226 | 228 |
| Hm (J/g)$^K$ | — | — | — | 21 | — | 20 | 20 |
| Tcc (°C.)$^L$ | — | — | — | 172 | — | 168 | 172 |
| Hcc (J/g)$^M$ | — | — | — | 16 | — | 15 | 16 |

$^A$25:75 copolymer of poly(cis-/trans-1,4-cyclohexane-dimethylene-trans-1,4-cyclohexane dicarboxylate).
$^B$poly(1,4-cyclohexanedimethylene-trans-1,4-cyclohexane dicarboxylate-melt viscosity 3000 poise at 250° C.
$^C$Surlyn ® 8940 - E. I. DuPont de Nemours & Co. - Wilmington, DE.
$^D$ABS modifier - BLENDEX ® 338 - General Electric Co. - Pittsfield, MA.
$^E$core-shell multi-stage polymer - core = polymerized butadiene and styrene, methylmethacrylate and divinylbenzene - second stage/shell = polymerized styrene - outer shell = polymerized methylmethacrylate and 1,3-butylene glycol dimethacrylate - (ACRYLOID ® KM 653, also known as PARALOID ® EXL 3691 - Rohm & Haas Co. - Philadelphia, PA.
$^F$SEBS modifier - styrene-hydrogenated polybutadiene-styrene block copolymer - weight average molecular weight = 238,000 ± 4,000 (Kraton ® G1651 - Shell Chemical Co. - Houston, TX).
$^G$after storing the parts at 250° C. for 3 hours.
$^H$peak crystallization temperature when heated at 20° C./min. from the amorphous state.
$^I$enthalpy of crystallization when heated at 20° C./min. from the amorphous state.
$^J$peak melting temperature when heated at 20° C./min. from the amorphous state.
$^K$enthalpy of melting when heated at 20° C./min. from the amorphous state.
$^L$peak crystallization temperature when cooled at 60° C./min. from the molten state.
$^M$enthalpy of crystallization when cooled at 60° C./min. from the molten state.

All patents, applications, publications, and test methods mentioned above are hereby incorporated by reference.

Many variations of the present invention will suggest themselves to those skilled in this art in light of the above, detailed description. All such obvious variations are within the full intended scope of the appended claims.

We claim:
1. A composition comprising:
   (A) from 75 to 95 parts by weight of a polyester resin comprising the reaction product
      (a) at least one straight chain, branched, or cycloaliphatic $C_2$–$C_{10}$ alkane diol or chemical equivalent thereof; and
      (b) at least one cycloaliphatic diacid or chemical equivalent thereof; and
   (B) from 5 to about 25 parts by weight of a substantially amorphous resin comprising a terpolymer of acrylonitrile, at least 62 percent by weight butadiene, and styrene, wherein the styrene to acrylonitrile ratio is from about 3.5:1 to about 2.5:1 and the butadiene to styrene/acrylonitrile ratio is 7:3, the sum of (A) and (B) being 100 parts by weight.
2. A composition as defined in claim 1 wherein said diacid (A)(b) comprises trans-1,4-cyclohexanedicarboxylic acid.
3. A composition as defined in claim 1 wherein said diacid (A)(b) comprises a mixture of cis- and trans-1,4-cyclohexanedicarboxylic acid.
4. A composition as defined in claim 1 wherein said diacid chemical equivalent (A)(b) comprises a dialkyl ester of the diacid.
5. A composition as defined in claim 4 wherein said dialkyl ester (A)(b) comprises dimethyl-1,4-cyclohexanedicarboxylate.
6. A composition as defined in claim 5 wherein said dialkyl ester (A)(b) comprises dimethyl-trans-1,4-cyclohexanedicarboxylate.
7. A composition as defined in claim 5 wherein said dialkyl ester (A)(b) comprises a mixture of dimethyl-cis- and dimethyl-trans-1,4-cyclohexanedicarboxylate.
8. A composition as defined in claim 1 wherein said polyester resin (A) comprises poly(1,4-butylene-trans-1,4-cyclohexanedicarboxylate).
9. A composition as defined in claim 1 wherein said polyester resin (A) comprises a copolymer comprising monomers of 1,4-butylene-cis-1,4-cyclohexane dicarboxylate and 1,4-butylene-trans-1,4-cyclohexane dicarboxylate.
10. A composition as defined in claim 1 further comprising

(a) reinforcing filler, (b) flame retardant, (c) pigment, (d) nucleating agent, (e) stabilizer, or (f) a combination of any of the foregoing.

11. A composition as defined in claim 10 wherein said reinforcing filler (a) is selected from the group consisting of glass fibers, talc or a combination thereof.

12. A composition as defined in claim 1 wherein said ratio of styrene to acrylonitrile selected from the group consisting of 3.5:1, 3:1 and 2.5:1.

13. A composition as defined in claim 1 wherein said polyester resin (A) comprises from about 80 to about 85 parts by weight and said modifier (B) comprises from about 20 to about 15 parts by weight based upon 100 parts by weight of (A) and (B) combined.

14. A composition as defined in claim 13 wherein said polyester resin (A) comprises 85 parts by weight and said modifier comprises 15 parts by weight based upon 100 parts by weight of (A) and (B) combined.

15. An article molded from a composition as defined in claim 1.

16. An article extruded from a composition as defined in claim 1.

17. An article thermoformed from a composition as defined in claim 1.

18. A composition as defined in claim 1, wherein said composition consists essentially of said polyester resin and said amorphous terpolymer resin.

19. A composition as defined in claim 1, wherein said composition consists of said polyester resin and said amorphous terpolymer resin.

20. A composition consisting essentially of;

(A) from 75 to 95 parts by weight of poly(1,4-butylene-1,4-cyclohexanedicarboxylate;

(B) from 5 to 25 parts by weight of a terpolymer of acrylonitrile, butadiene, and styrene, wherein the terpolymer contains 40 to 80 weight percent of a rubber portion and 20 to 60 weight percent of a rigid portion based on the total weight of the rubber and rigid portion, wherein the ratio of styrene to acrylonitrile is from about 3.5:1 to about 2.5:1 and the ratio of butadiene to styrene/acrylonitrile is 7:3, the sum of (A) and (B) being 100 parts by weight;

(C) reinforcing filler selected from the group consisting of glass fibers, talc or a combination thereof;

(D) optionally a flame retardant;

(E) optionally a pigment;

(F) optionally a nucleating agent; and (G) optionally a stabilizer.

* * * * *